United States Patent
Morano

(10) Patent No.: US 12,179,710 B2
(45) Date of Patent: Dec. 31, 2024

(54) ROOF ATTACHMENT FOR RAIL-BASED SOLAR RACKING SYSTEM

(71) Applicant: EcoFasten Solar, LLC, Phoenix, AZ (US)

(72) Inventor: Alexander Morano, Portland, OR (US)

(73) Assignee: EcoFasten Solar, LLC, Phoenix, AZ (US)

( * ) Notice: Subject to any disclaimer, the term of this patent is extended or adjusted under 35 U.S.C. 154(b) by 0 days.

(21) Appl. No.: 18/558,377

(22) PCT Filed: Mar. 27, 2023

(86) PCT No.: PCT/US2023/016447
§ 371 (c)(1),
(2) Date: Nov. 1, 2023

(87) PCT Pub. No.: WO2023/192199
PCT Pub. Date: Oct. 5, 2023

(65) Prior Publication Data
US 2024/0227688 A1    Jul. 11, 2024

Related U.S. Application Data

(60) Provisional application No. 63/324,281, filed on Mar. 28, 2022.

(51) Int. Cl.
*B60R 9/058*    (2006.01)
(52) U.S. Cl.
CPC .................................... *B60R 9/058* (2013.01)

(58) Field of Classification Search
CPC ......... B60R 9/058; H02S 20/00; F24J 2/5205; F24J 2/5245; F24J 2/5258
See application file for complete search history.

(56) References Cited

U.S. PATENT DOCUMENTS 6,032,939 A * 3/2000 Chen ....................... B25B 1/103
269/251
9,057,542 B2   6/2015 Schuit et al.
9,187,047 B2 * 11/2015 Sautter ................... B60R 9/045
(Continued)

OTHER PUBLICATIONS

"SpeedSealTM Technology". SnapNrack. https://snapnrack.com/products/speedseal/.

*Primary Examiner* — Brian D Nash
(74) *Attorney, Agent, or Firm* — The Webb Law Firm

(57) ABSTRACT

A roof attachment device having a roof attachment bracket, a lag screw, a rail attachment bracket, and a rail. The roof attachment bracket having an elongated aperture and a first aperture; wherein the fastener extends through the first aperture and attaches the roof attachment bracket to the roof. The rail attachment bracket comprising a rail connecting member having a second aperture, a third aperture, and an access port; a first bolt coupling the roof attachment bracket to the rail connecting member; wherein the access port and first aperture are aligned to allow the lag screw to extend through the first aperture; an outside clamping member having a fourth aperture; and a second bolt extending through the fourth and third apertures coupling the outside clamping member and the rail connecting member together; and a resilient clip loosely connecting the outside clamping member and the rail connecting member.

11 Claims, 21 Drawing Sheets

(56) References Cited

U.S. PATENT DOCUMENTS

| | | | | |
|---|---|---|---|---|
| 9,341,201 B2* | 5/2016 | McPheeters | ............ | H02S 20/30 |
| 9,506,600 B1* | 11/2016 | Li | ............ | H02S 20/23 |
| 9,660,567 B2* | 5/2017 | Goehringer | ............ | F16M 11/00 |
| 2010/0276558 A1* | 11/2010 | Faust | ............ | F24S 25/12 |
| | | | | 248/316.1 |
| 2011/0138585 A1 | 6/2011 | Kmita et al. | | |
| 2011/0283492 A1* | 11/2011 | McPheeters | ............ | F24S 25/00 |
| | | | | 24/569 |
| 2013/0048815 A1* | 2/2013 | Wagner | ............ | F24S 25/61 |
| | | | | 248/228.1 |
| 2013/0299655 A1* | 11/2013 | Sader | ............ | H02S 20/23 |
| | | | | 248/295.11 |
| 2015/0288320 A1 | 10/2015 | Stearns et al. | | |
| 2016/0039350 A1* | 2/2016 | Patel | ............ | B60R 9/058 |
| | | | | 224/324 |
| 2019/0372507 A1 | 12/2019 | Kobayashi | | |
| 2020/0116191 A1* | 4/2020 | Uppu | ............ | H02S 20/00 |
| 2021/0102577 A1 | 4/2021 | Kovacs et al. | | |
| 2023/0336108 A1* | 10/2023 | Morano | ............ | H02S 30/00 |

\* cited by examiner

ROOF ATTACHMENT FOR RAIL-BASED SOLAR RACKING SYSTEM

CROSS-REFERENCE TO RELATED APPLICATIONS

This application is the United States national phase of International Application No. PCT/US23/16447 filed Mar. 27, 2023, and claims priority to U.S. Provisional Patent Application No. 63/324,281 filed Mar. 28, 2022, the disclosures of which are hereby incorporated by reference in their entirety.

BACKGROUND OF THE DISCLOSURE

Field of the Disclosure

The present disclosure relates generally to a device for securing a rail-based solar module support structure to a roof and, more particularly, for attaching a rail to roof attachment brackets with clamps which can be levelled independently of the rail attachment.

Description of Related Art

Any discussion of the prior art in the Specification should in no way be considered as an admission that the prior art is widely known or forms part of common general knowledge in the field.

The installation of solar module arrays on residential and commercial roofs can be arduous and time-consuming. Depending on the array design, the components required to install the array can make the installation process even more difficult. Many of the assembly components are difficult to install because they must be installed to specific heights. Additionally, the proper height adjustment and rail attachment functions are difficult to achieve because height adjustment and rail attachment affect one another. This is particularly true when the elements must be installed on a roof and said elements link to a rail guide for supporting the solar module array.

In a typical roof attachment for a rail-based solar racking system, solar modules are arranged across the top of several rails or rail guides. The rail guides are secured to the roof by roof attachments, which attachments are often underlain by flashing. A typical roof attachment is in the shape of an "L", but can be any suitable shape that serves to connect the rail guide to the roof.

When connecting the roof attachment to the rail guide, a nut and bolt combination is typically used.

Existing solutions are typically limited by their inability to easily and precisely secure the rail-based solar racking system to the roof while having accessible height adjustment and rail attachment. One example of this is shown in the SnapNrack™ Ultra Rail Umbrella L Foot product. The product discloses a nut and bolt combination, an elongated mounting L bracket, and a rail attachment bracket that can secure a mounting rail to a roof. The elongated L bracket has an aperture where a bolt nut combination attaches the L bracket to the rail attachment bracket. The bottom of the L bracket has an aperture for access to attach the assembly to a roof. The connecting of the rail guide to the rail attachment bracket is achieved inseparably from the connecting of the rail attachment bracket to the mounting bracket. The product does not teach or suggest a combination nut and bolt with mount bracket such that the members are independently height adjustable and able to attach to a rail system. The product also does not disclose that the rail attachment point is directly above the lag screw and includes a clearance aperture. The present disclosure provides these and other advantages over the prior art SnapNrack™ Ultra Rail Umbrella L Foot product.

It is thus an object of the present disclosure to overcome these limitations and provide for independent height adjustment and rail attachment, while minimizing the visibility of parts outside the footprint of a solar module array installed on a roof.

SUMMARY OF THE INVENTION

The disclosure is summarized below only for purposes of introducing embodiments of the disclosure. The ultimate scope of the disclosure is to be limited only to the Claims that follow the Specification.

The disclosure provides a device for securing a rail support for a solar module to a roof.

In one aspect of the disclosure, the device includes a roof attachment bracket, for example, an Roof attachment bracket having an upright portion including an elongated aperture and a first aperture; a rail attachment bracket comprised of a rail connecting member having a second aperture, a third aperture, and an access port; a first bolt coupling the Roof attachment bracket to the rail connecting member; an outside clamping member having a fourth aperture; and a second bolt coupling the outside clamping member to the rail connecting member; and a lag screw coupled to the first aperture; where the access port and first aperture are aligned to allow the lag screw to be coupled to the roof or supporting structure through the first aperture.

In another aspect of the disclosure, a roof attachment device includes a roof attachment bracket having an upright portion and an elongated aperture; a rail attachment bracket including a rail connecting member having a second aperture, a third aperture, and an access port; a clamping member having a fourth aperture; and a second bolt connecting the rail connecting member and the clamping member; and a first bolt coupling the upright portion to the rail attachment bracket; where the first bolt and the second bolt are aligned.

In another aspect of the disclosure, the roof attachment bracket has a serrated portion that couples to the rail connecting member.

In another aspect of the disclosure, the rail connecting member has a serrated portion that couples to the roof attachment bracket.

In another aspect of the disclosure, the rail attachment bracket further includes a clip which couples the rail connecting member to the clamping member, the clip having a center aperture to allow the second bolt to pass through the clip.

In another aspect of the disclosure, the clip creates an audible sound by urging the rail connecting member and the clamping member against each other.

In another aspect of the disclosure, the rail connecting member includes a first wall, a bottom portion, and a second wall.

In another aspect of the disclosure, the first wall has a first shelf, a first retaining tooth and a first recess therebetween.

In another aspect of the disclosure, the clamping member includes a third wall and an extending arm.

In another aspect of the disclosure, the third wall has a second shelf, a second retaining tooth and a second recess therebetween.

In another aspect of the disclosure, the bottom portion defines a shaped recess configured to receive the extending arm.

In another aspect of the disclosure, a rail attachment bracket includes: a rail connecting member including a first wall having an second aperture and a serrated portion on one side of the first wall and a recess on an opposing side of the first wall, the recess formed between a retaining tooth and shelf; a second wall being shorter in height than the first wall, having a third aperture; and a bottom portion which separates the first wall and the second wall, the bottom portion having an access port; where the access port is larger in diameter than the second aperture and third aperture and the apertures are axially aligned.

In another aspect of the disclosure, a roof attachment bracket having an upright portion and an elongated aperture connect to the serrated portion of the rail attachment bracket such that the elongated aperture and the second aperture and third aperture are axially aligned.

In another aspect of the disclosure, a clamping member including a wall having a fourth aperture and a recess formed between a retaining tooth and shelf and a bolt which releaseably fixes the clamping member to the rail connecting member.

In another aspect of the disclosure, a clip including a central body portion with a center aperture and at least one pair of wings which releasably couple the clip to the clamping member.

In another aspect of the disclosure, the center aperture of the clip axially aligns with the third aperture of the second wall.

In another aspect of the disclosure, a roof attachment bracket including an upright portion including a serrated surface and an elongated aperture, the roof attachment bracket being adjustably coupled to the rail connecting member such that the serrated surface of the roof attachment bracket mates with the serrated portion on one side of the first wall.

In another aspect of the disclosure, the roof attachment bracket includes a mounting bracket base including a mounting base aperture which aligns with the access port of the rail connecting member when the roof attachment bracket and the rail connecting member are adjustably coupled.

In another aspect of the disclosure, the second aperture and third aperture of the rail connecting member, the center aperture of the clip, and the fourth aperture of the clamping member are axially aligned such that bolts may be coupled through.

In another aspect of the disclosure, a method of installing a rail to the roof attachment device, includes: loosening at least one of the bolts; pushing the rail in a downward direction towards the rail connecting member; contacting a bottom portion of the rail with the retaining teeth of the rail connecting member and the end clamp; applying a downward directional force to the rail to cause the lateral distance between the first and second rail attachment teeth to increase until the flanges of the rail pass the attachment teeth downward; and tightening at least one of the bolts to releasably fix the rail to the rail connecting member.

In another aspect of the disclosure, the method of installing a rail to the roof attachment device, further includes angling the rail such that one of the rail flanges contacts the retaining teeth of the rail connecting member or the end clamp before the other rail flange.

Other aspects of the disclosure will become apparent by consideration of the detailed description and accompanying drawings.

BRIEF DESCRIPTION OF THE DRAWINGS

A more complete understanding of the present disclosure may be derived by referring to the detailed description and claims when considered in connection with the following illustrative figures. In the following figures, like reference numbers refer to similar elements and steps throughout the figures. The figures do not limit the present disclosure and only provide example embodiments.

DESCRIPTION OF THE DISCLOSURE

Before any independent embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including." "comprising." or "having" and variations thereof herein are meant to encompass the items listed thereafter and equivalents thereof as well as additional items.

Unless specified or limited otherwise, the terms "mounted." "connected," "supported." and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," etc.) are only used to simplify description of embodiments of the present disclosure and do not alone indicate or imply that the device or element referred to must have a particular orientation. In addition, terms such as "first" and "second" are used herein for purposes of description and are not intended to indicate or imply relative importance or significance.

Figure 1A:
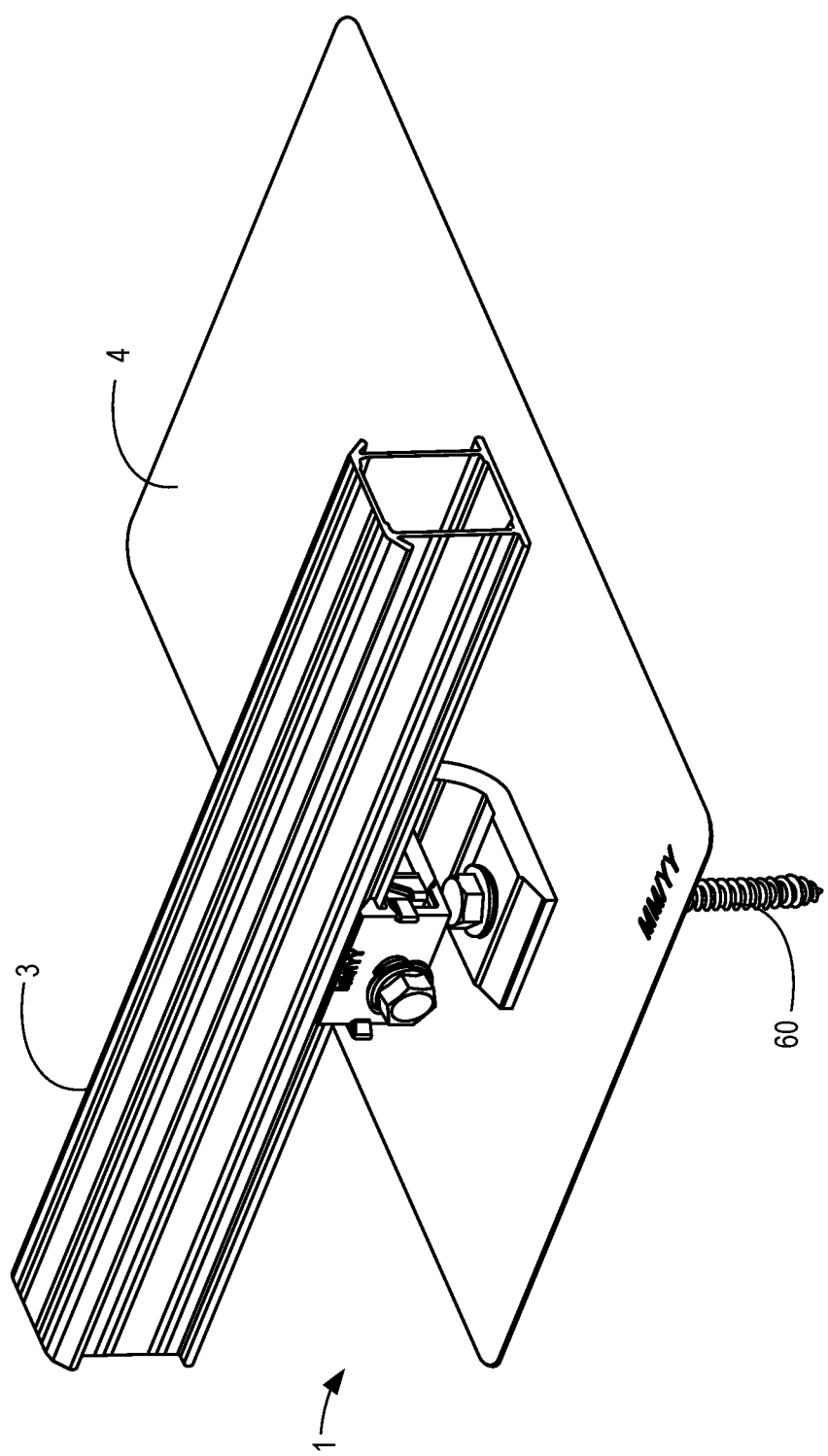
FIG. 1a illustrates an example embodiment of the roof attachment device with a flashing and rail attached and the rail oriented across the roof slope and down-slope of the roof attachment bracket upright portion.
Figure 1B:
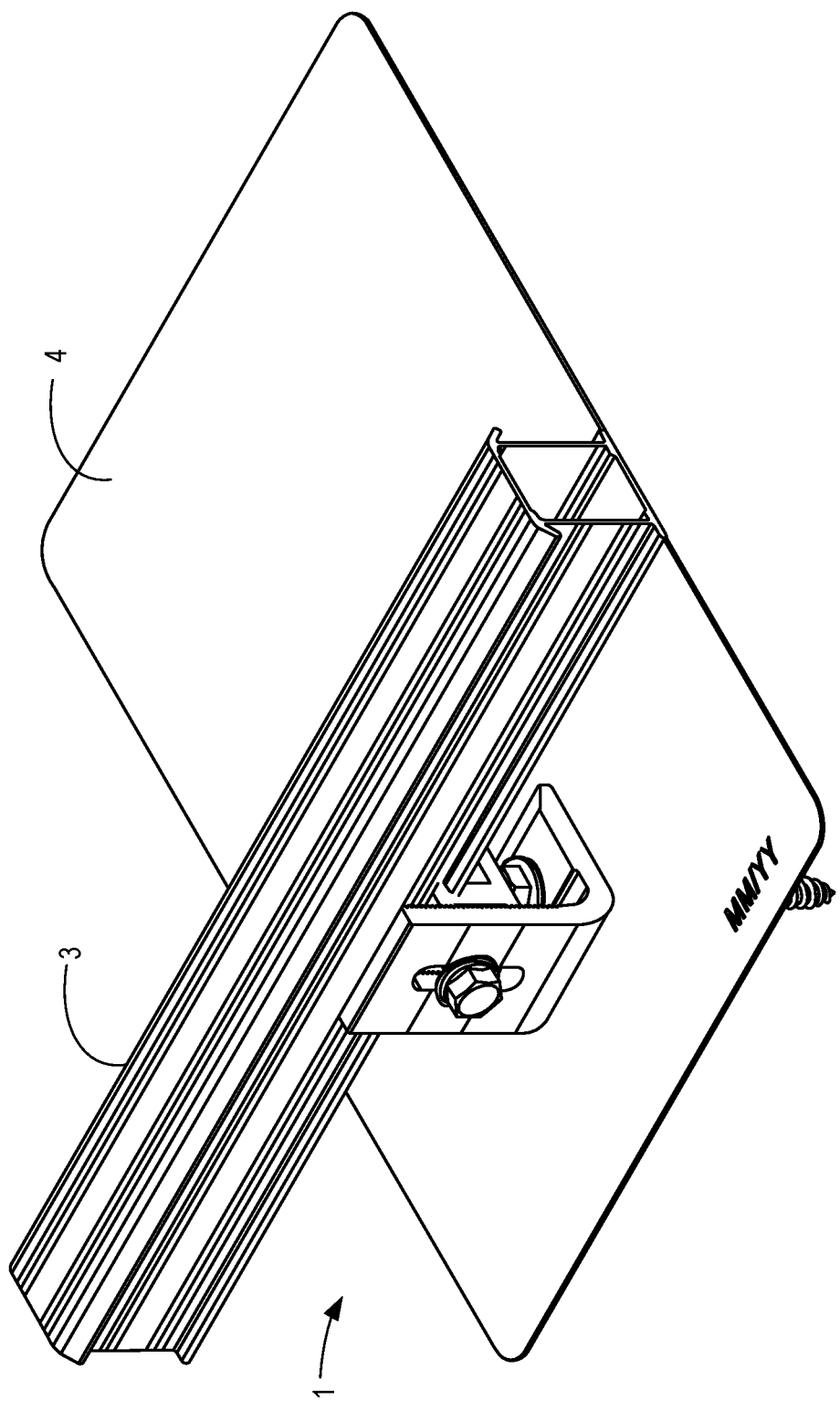
FIG. 1b illustrates an alternate example embodiment of the roof attachment device with a flashing and rail attached and the rail oriented across the roof slope and up-slope of the roof attachment bracket upright portion.
Figure 1C:
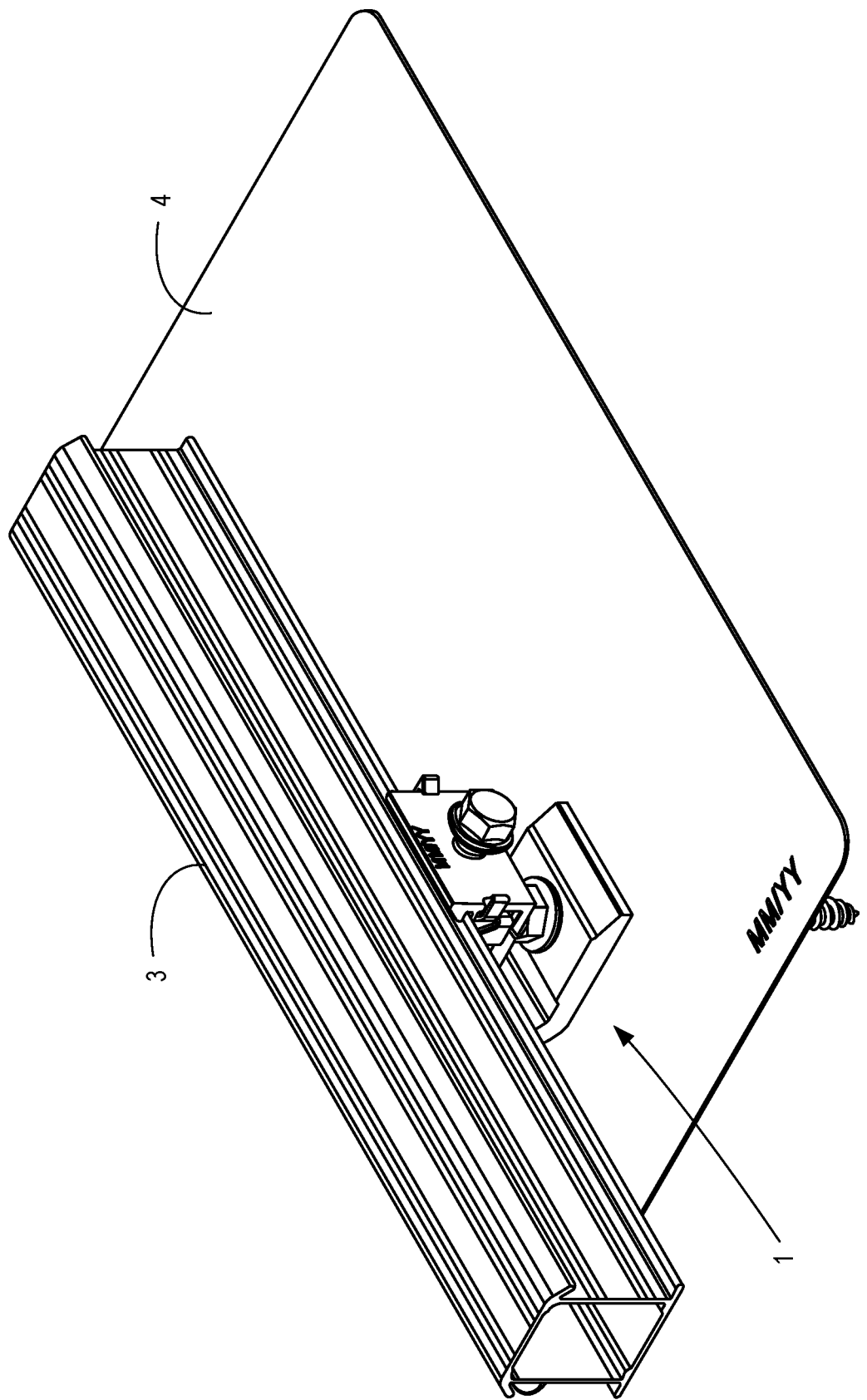
FIG. 1c illustrates an alternate example embodiment of the roof attachment device with a flashing and rail attached and the rail oriented parallel to the slope of the roof.
Figure 2:
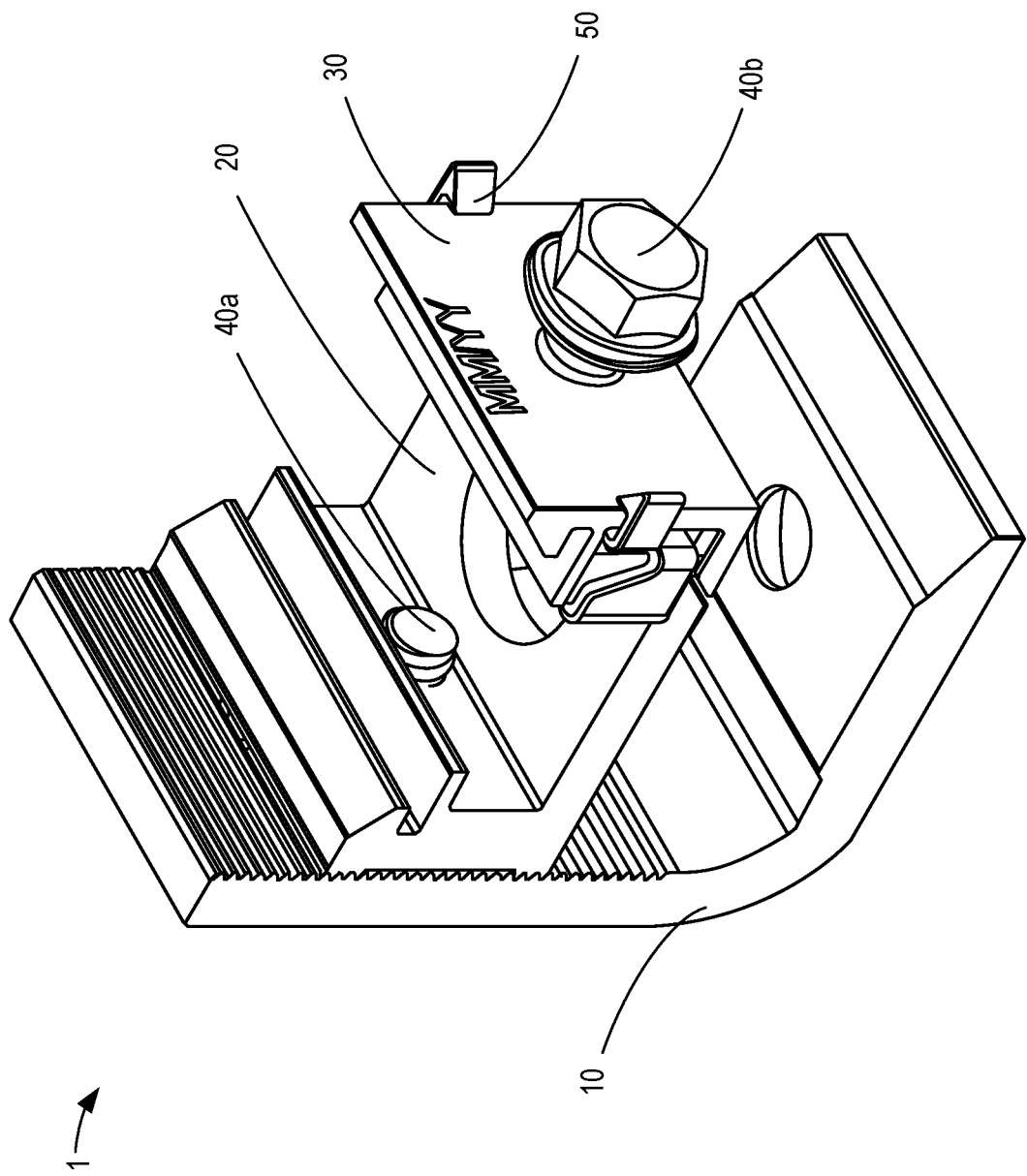
FIG. 2 illustrates an isometric view of the roof attachment device.
Figure 12:
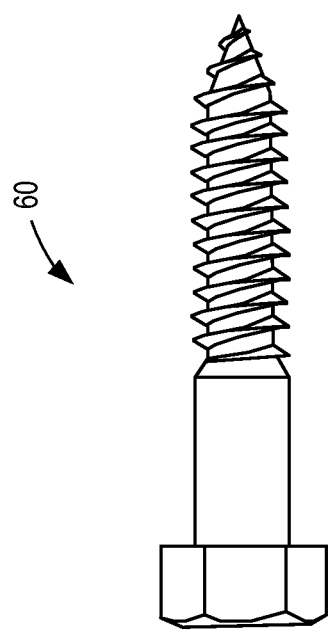
FIG. 12 illustrates a side and top view of the lag screw.

FIGS. 1a-1c illustrate a preferred embodiment of the roof attachment device 1 assembled with the flashing 4 and rail 3. The illustrated roof attachment 1 may be fixed directly or indirectly to the roof or surface (not shown for clarity) using an attachment means such as a fastener or lag screw 60 as illustrated in FIG. 1a and FIG. 12. A flashing 4 or other member for scaling may be placed in between the roof attachment device 1 and the roof or surface.

FIGS. 2-5 illustrate an exemplary embodiment of the roof attachment bracket 10. The roof attachment bracket 10 is typically made of aluminum, metal, or a material with similar composition. The roof attachment bracket 10 may be made of aluminum or a material with similar material properties. The roof attachment bracket 10 may be extruded or manufactured by other means. The roof attachment bracket 10 may be a single piece or a combination of pieces. The roof attachment bracket 10 is not limited to only an L-shape, but may be any shape which allows for the a rail attachment bracket 2 to be fixed to the upright portion 13 while the other end may be fixed to a roof or surface. The elongated aperture 12 is positioned on the upright portion 13 of the roof attachment bracket 10 vertically, extending a length or distance between the upright portion bottom end 14 and the upright portion top end 16. The elongated aperture 12 is sized to serve as a variable attachment point for the first bolt 40a to be coupled through the elongated aperture 12 to the rail connecting member 20. The first bolt 40a can be adjusted in distance between the bottom end 14 of the Roof attachment bracket 10 to the top end 16 of the Roof attachment bracket 10 while still being projected through the elongated aperture 12 along the elongated aperture 12. When the height of the rail connecting member 20 is vertically adjusted, the overall height of the solar modules in reference to the roof is adjusted. The total change in height is not limited to the vertical length of the elongated aperture 12 as other attachment means may be used for additional height adjustments.

Figure 3A:
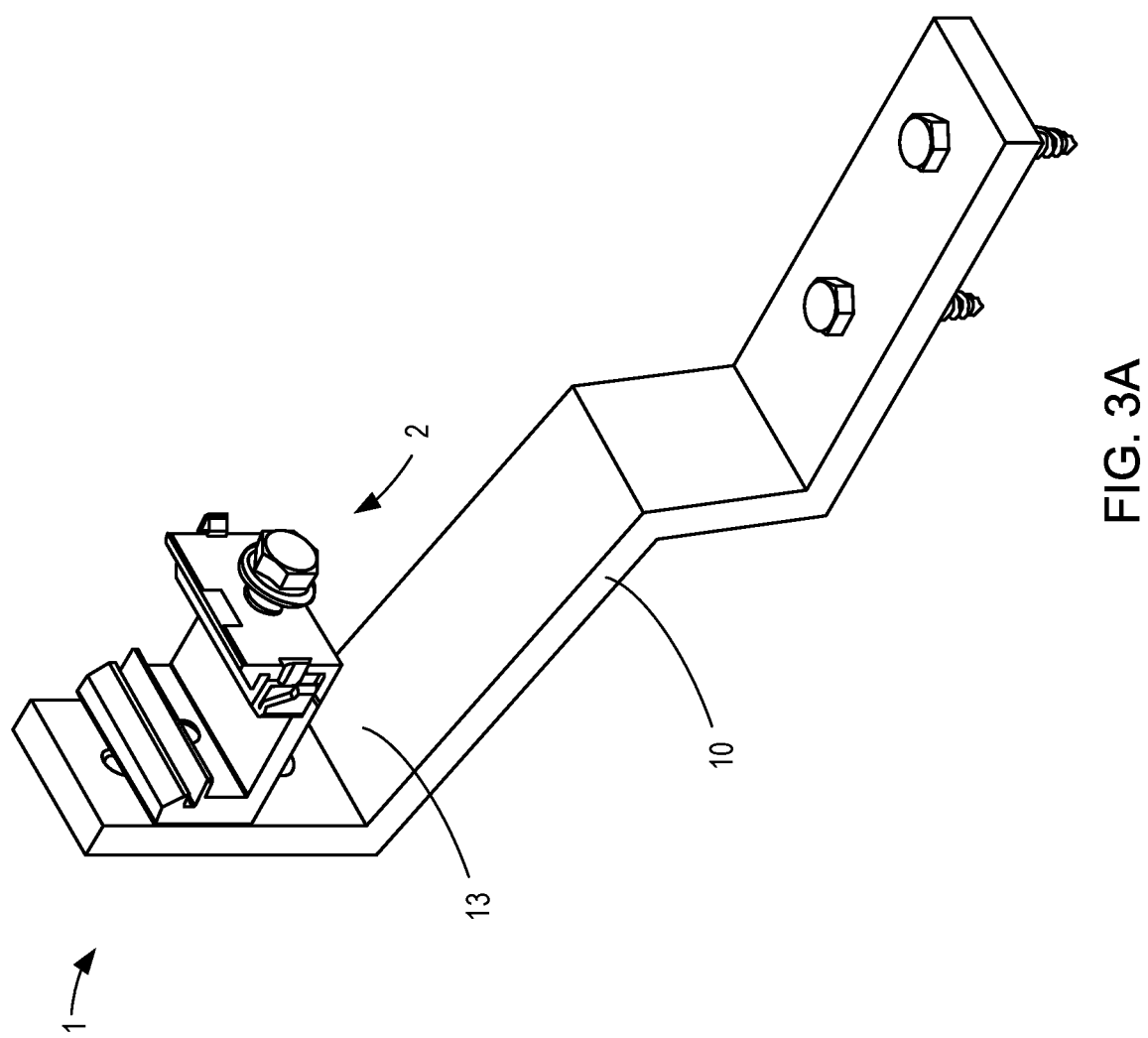
FIG. 3a illustrates an isometric view of an alternative example embodiment of the roof attachment device, i.e. a tile roof hook.
Figure 3B:
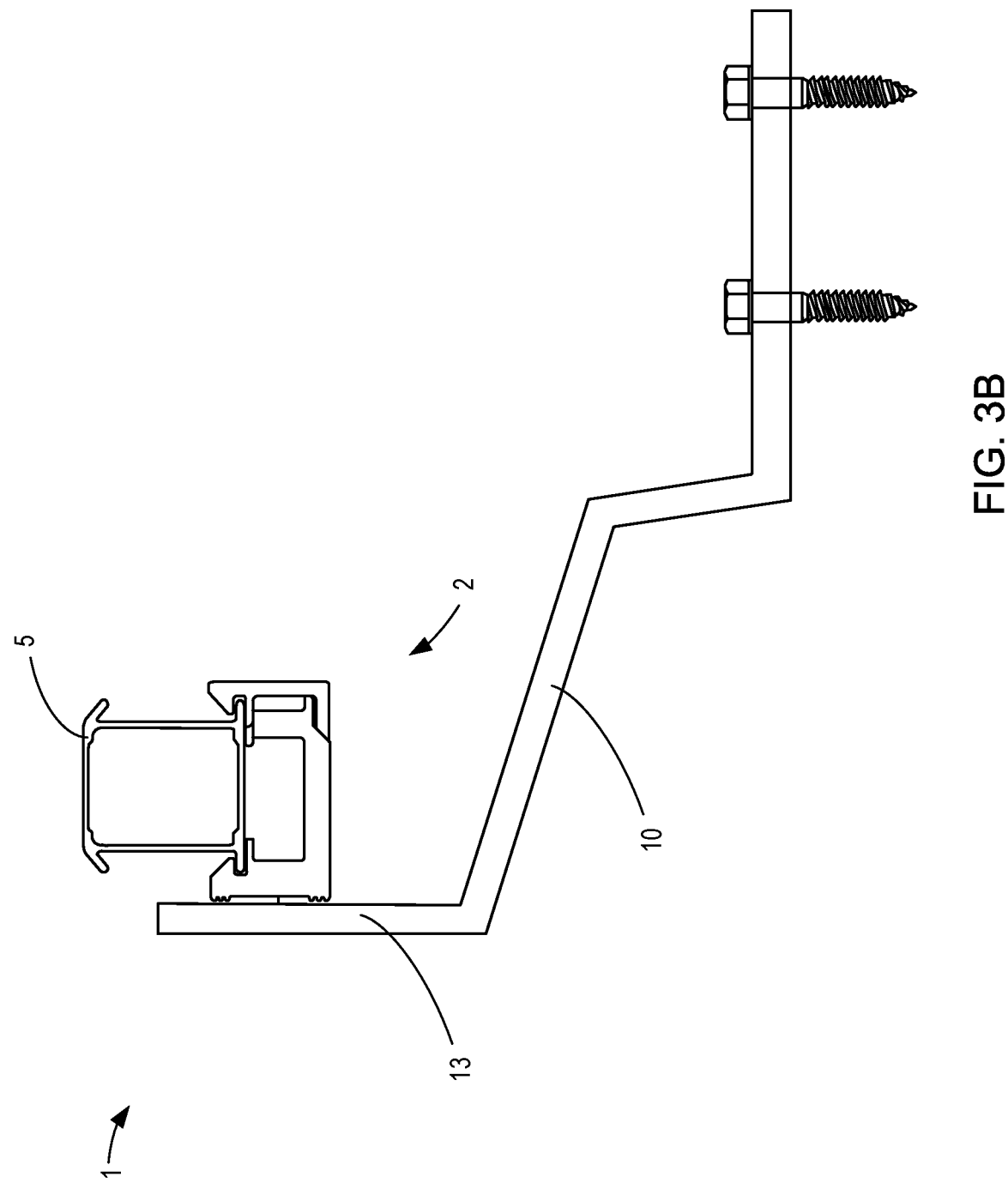
FIG. 3b illustrates a side view of an alternative example embodiment of the roof attachment device, i.e. a tile roof hook.
Figure 3C:
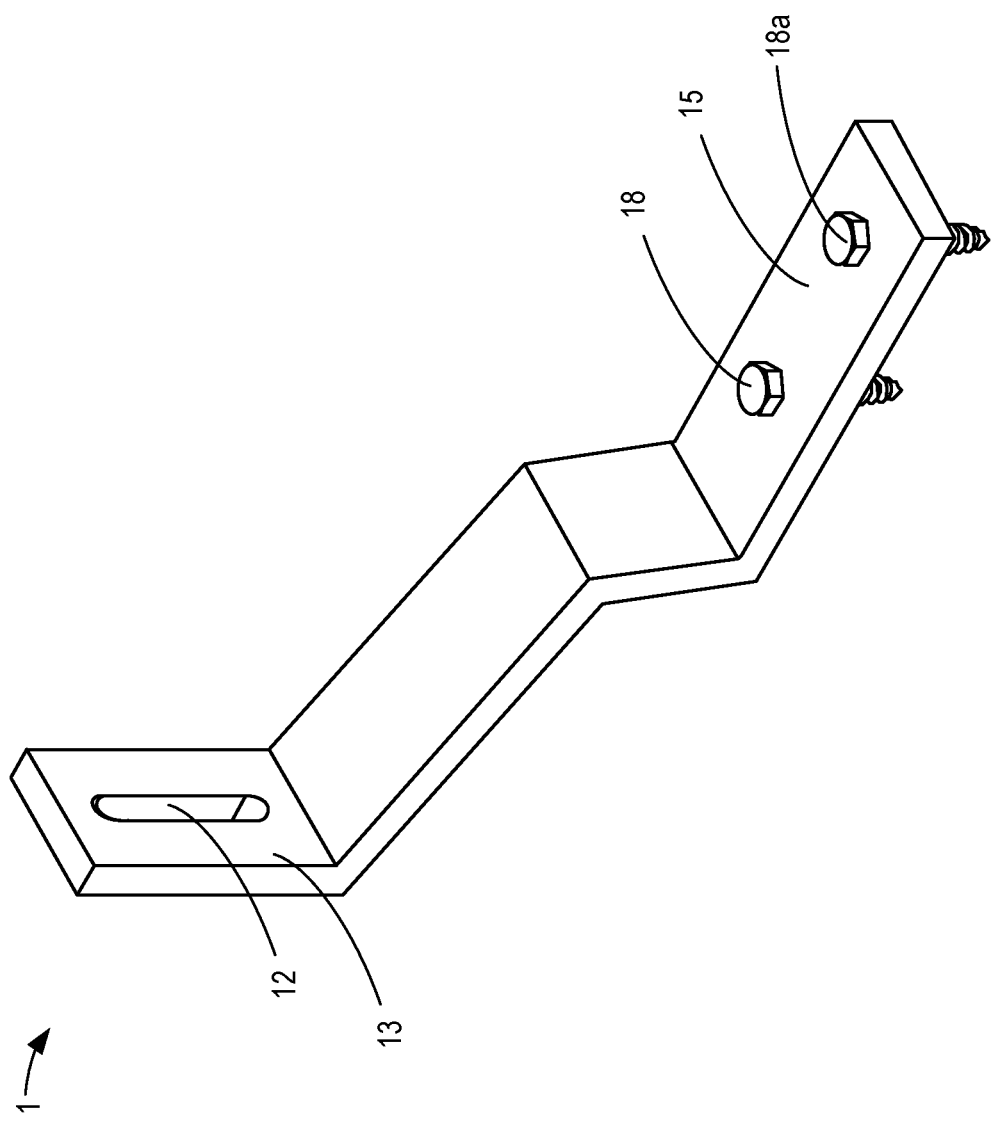
FIG. 3c illustrates an isometric view of an alternative example embodiment of the roof attachment bracket, i.e. a tile roof hook.
Figure 4A:
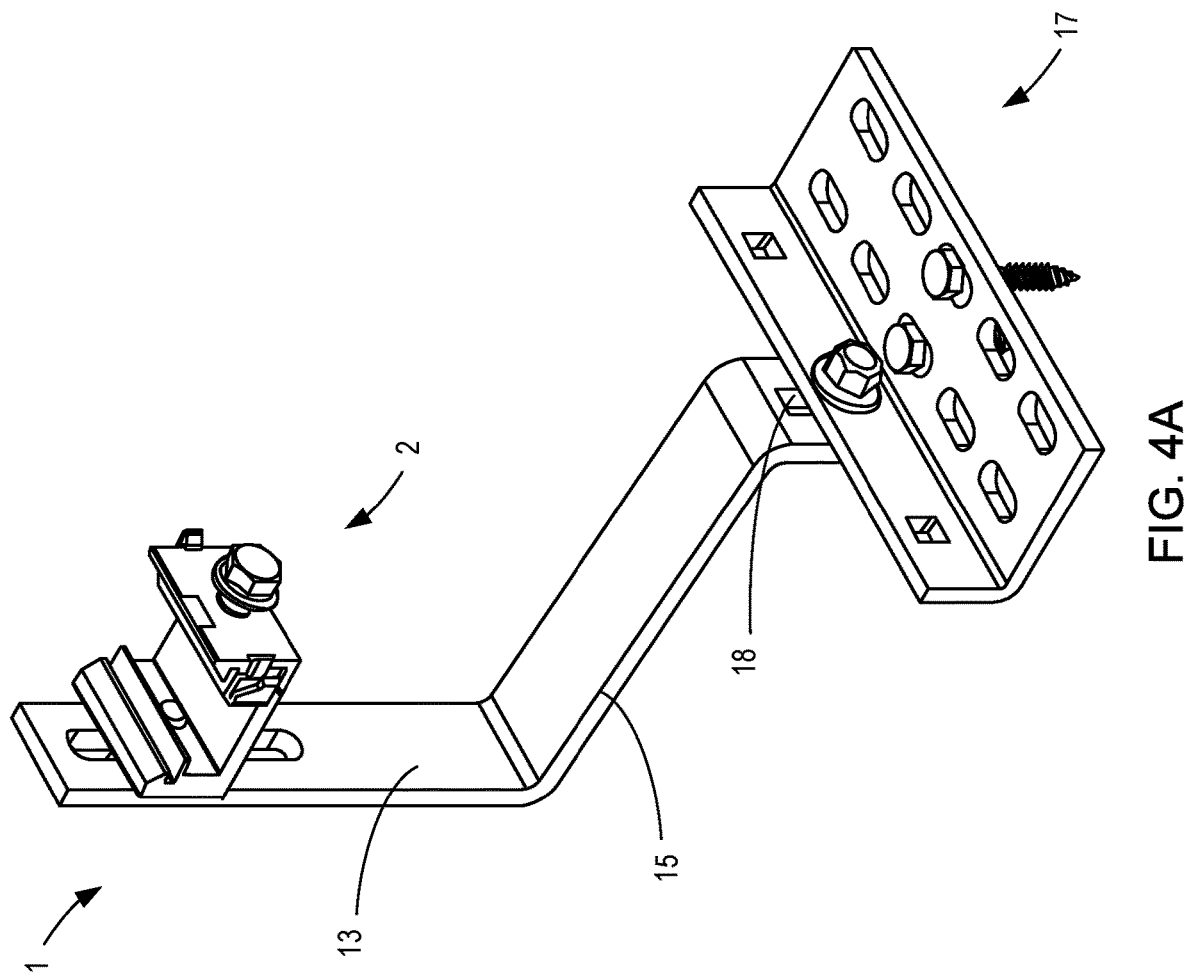
FIG. 4a illustrates an isometric view of an alternative example embodiment of the roof attachment device.
Figure 4B:
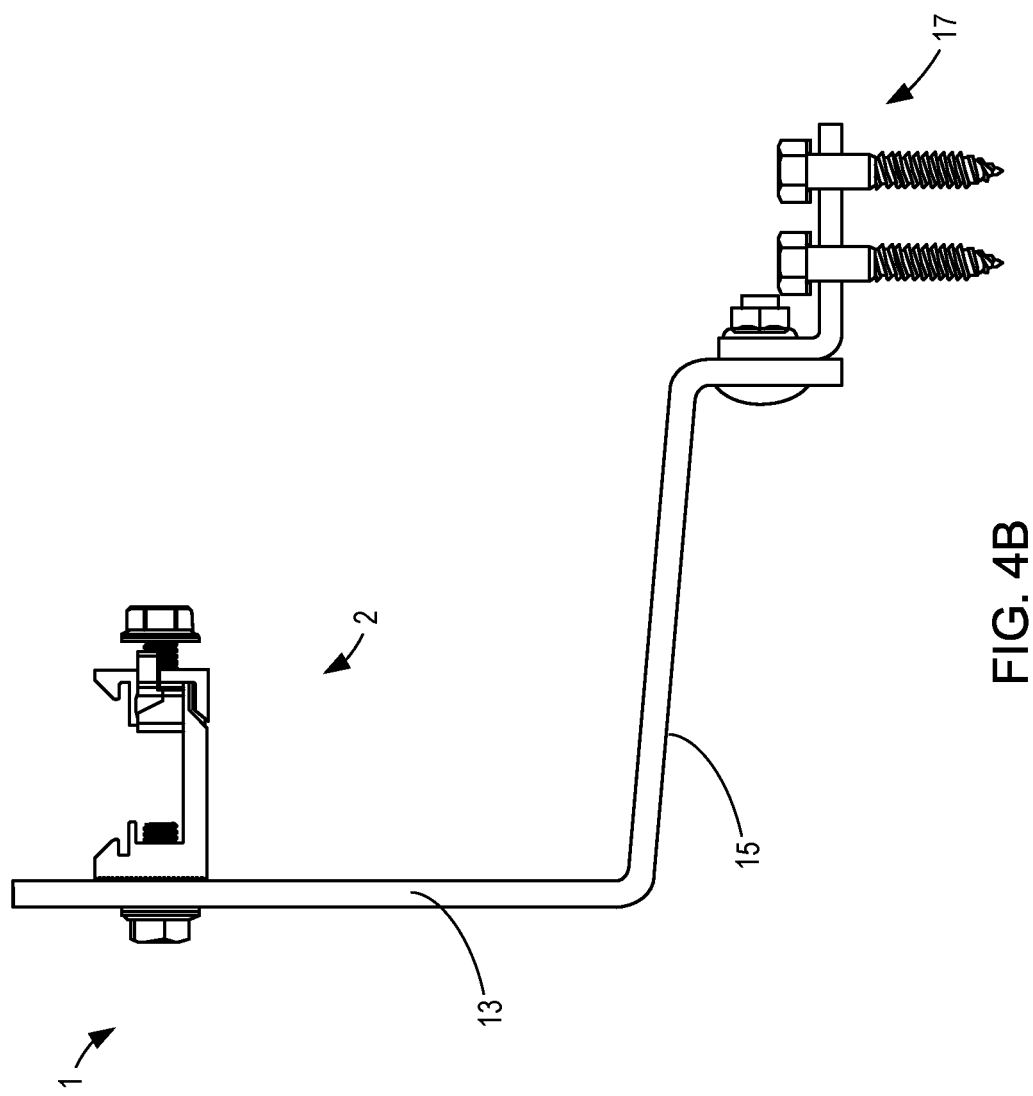
FIG. 4b illustrates a side view of another alternative example embodiment of the roof attachment device.
Figure 4C:
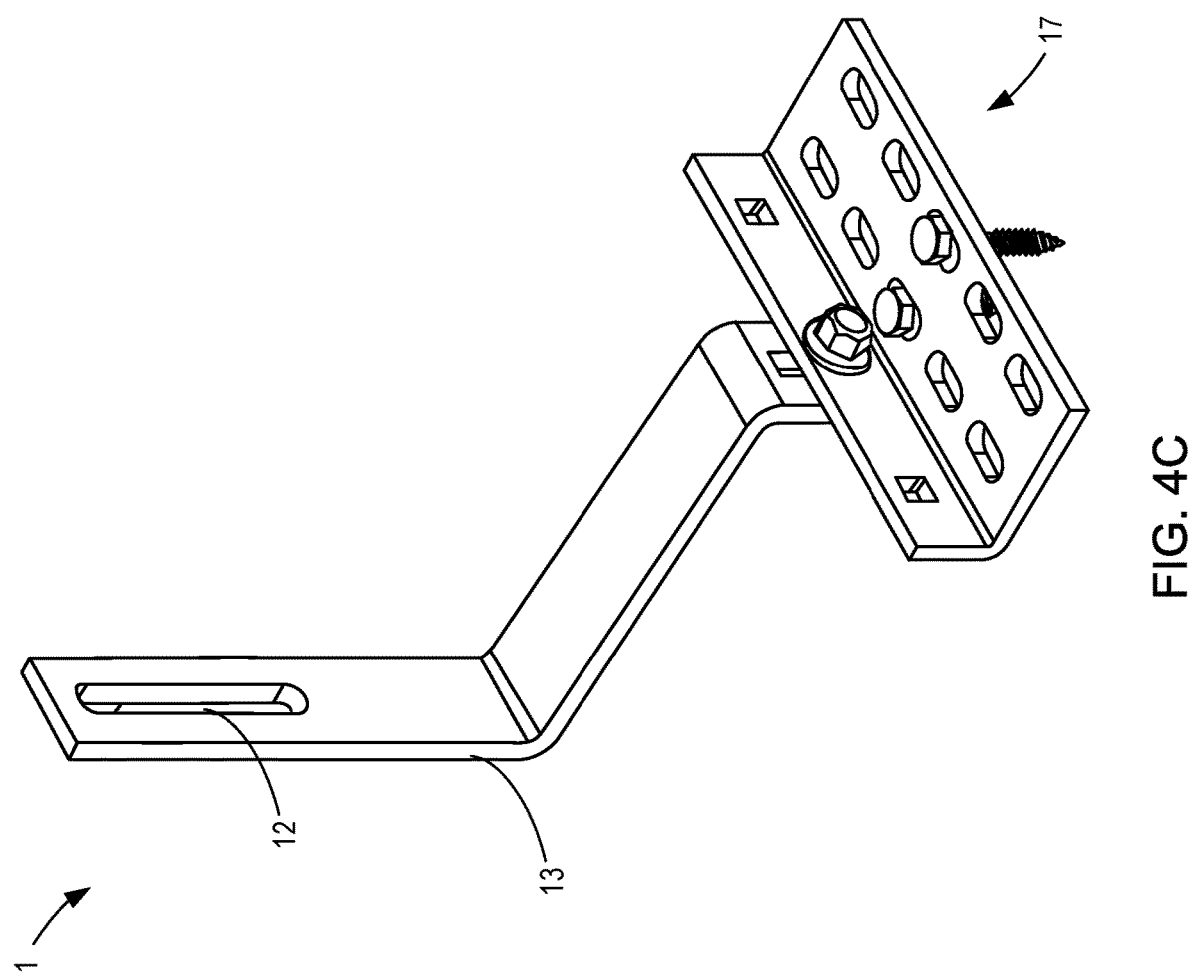
FIG. 4c illustrates an isometric view of an alternative example embodiment of the roof attachment bracket.
Figure 5:
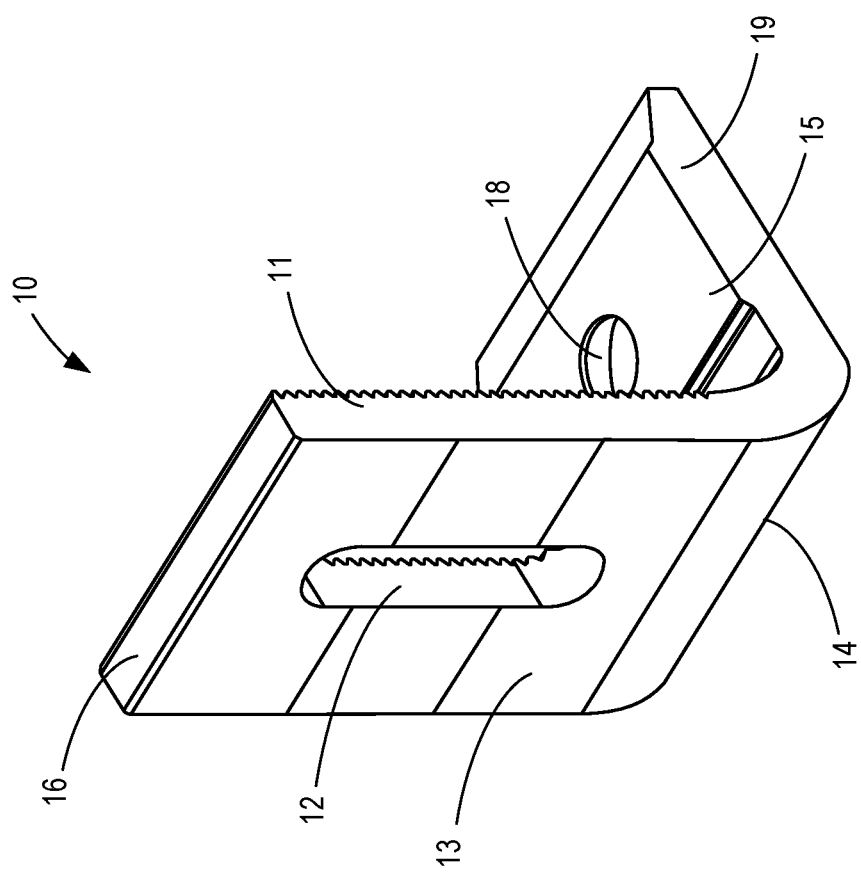
FIG. 5 illustrates an isometric view of the Roof attachment bracket.

The upright bracket portion 13 and mounting bracket base 15 of the roof attachment bracket, L-bracket, or tile hook 10 may meet at a corner forming an L shape and are approximately perpendicular as illustrated specifically in FIG. 5. The corner may also be rounded or shaped ergonomically. The first aperture 18 is located through the mounting bracket base 15 of the roof attachment bracket 10. The first aperture 18 may be threaded and can be any geometric shape. The first aperture 18 may have a different exit and entrance size through the base 15, the base 15 having a top surface and a bottom surface through which the first aperture 18 extends. Thus, the first aperture 18 may have a larger diameter at the bottom surface than at the top surface allowing for a frustoconical flashing projection to extend upward into the first aperture 18. The first aperture 18 may alternately be configured to receive a cylindrical flashing projection in which the first aperture 18 may have a consistent diameter throughout. Additionally, the first aperture 18 may include a cylindrical portion and a concave or tapering portion. The first aperture 18 is at least sized to have a lag screw 60 extend through to fix the roof attachment bracket 10 to a flashing 4, roof, surface, and/or structure. The first aperture 18 may be shaped to allow the lag screw 60 to sink and no longer be visible. The area surrounding the first aperture 18 on the base 15 may be raised or increased in thickness to increase the material strength around the first aperture 18. The increased thickness may also allow for an increased thread length through the first aperture 18. A front edge or toe 19 of the base 15 may have an angled, sloped or tapered portion. In other embodiments, as illustrated in FIGS. 3a-3c, the first aperture 18 may include a second aperture 18a for additional connection points and support for connecting the Roof attachment bracket or tile hook 10 to a surface. In other embodiments, as illustrated in FIGS. 4a-4c, the first aperture 18 is elongated in shape to allow for height adjustments.

The roof attachment bracket 10 may also include a serrated portion 11, not illustrated in FIG. 3c or 4c. The serrated portion 11 may fully surround the elongated aperture 12. The serrated portion 11 contacts mating serrations 21 on the rail connecting member 20 when the rail connecting member 20 and roof attachment bracket 10 are coupled, illustrated in FIG. 6. The serrated portion 11 limits or reduces the vertical movement of the rail connecting member 20 in reference to the upright portion 13 of the roof attachment bracket 10. The serrations of the serrated portion 11 are preferably angled at 60 degrees, but may be angled at any degree that limits or reduces the vertical movement of the rail connecting member 20 in reference to the upright portion 13. The serrated portion 11 may be on either or both sides of the upright portion 13 to allow for the rail attachment bracket 2 to connect to either side.

In an alternative embodiment, the top end 16 and bottom end 14 of the roof attachment bracket 10 connect at a corner forming an L shape and are not approximately perpendicular. The top end 16 and bottom end 14 may connect at an angle preferably 5 or 10 degrees from perpendicular, but any appropriate angle may be used. The angled roof attachment bracket 10 may be used with the roof attachment device 1 and a tilted rail system. The angled Roof attachment bracket 10 allows for an installation of a tilted system commonly on a variety of low slope commercial and residential roof types or surfaces but can also be used for tilt systems on sloped roofs to achieve a desirable slope to the solar array that is different from the slope of the roof or structure.

The roof attachment bracket 10 is an example of a preferred mounting bracket common in roof attachments for all types of roofs. However, as illustrated in FIGS. 3a-4c, alternate roof attachments for various roof types may utilize mounting brackets that are not L-shaped such as tile roof hooks, corrugated roof brackets, metal shingle mounts, standing seam roofing brackets, etc. Any other shaped roof attachment bracket can work with the present disclosure, including if the mounting bracket has an upright bracket portion 13 with the elongated aperture 12. The roof attachment bracket 10 may also attach to the roof via intervening structures such as slides, stanchions, or other structures or brackets as illustrated in FIGS. 4a-4c. In the embodiment of FIGS. 4a-4c, a structure 17 is releasably fixed to the bottom of the mounting bracket 10. The structure 17 allows for the mounting bracket 10 to be fixed to a wide variety of bases.

Figure 6:
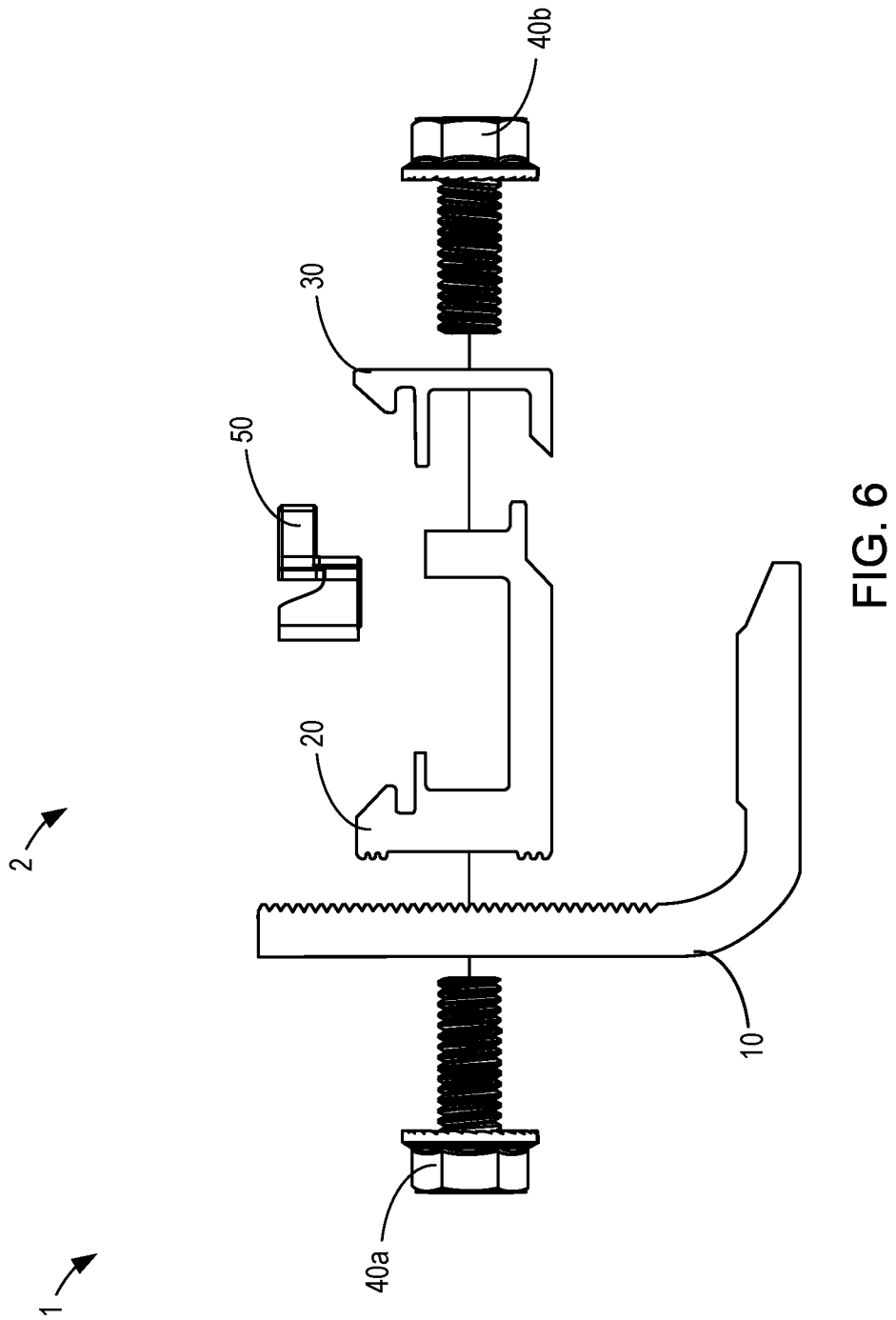
FIG. 6 illustrates an exploded view of the roof attachment device.

FIG. 6 illustrates an exploded side view of the roof attachment device 1. The roof attachment device 1 includes a roof attachment bracket 10 or other roof attachment bracket such as a tile hook 10, and a rail attachment bracket 2 which further includes a rail connecting member 20, an outside clamping member 30, and a resilient spring clip 50, and fasteners 40a; 40b. A first bolt 40a couples the rail connecting member 20 to the roof attachment bracket 10 through an elongated aperture 12 on the upright portion of the Roof attachment bracket 10 and a round aperture 22 on the rail connecting member 20. The aperture 22 may be round or an alternative shape which a bolt or connection means may couple through. A second bolt 40b connects an outside clamping member 30 to the rail connecting member 20. The clip 50 aids in maintaining a coupled connection to a rail positioned between the rail connecting member 20 and the outside clamping member 30, before the second bolt 40b fully connects the outside clamping member 30 to the rail and the rail connecting member 20.

Figure 7:
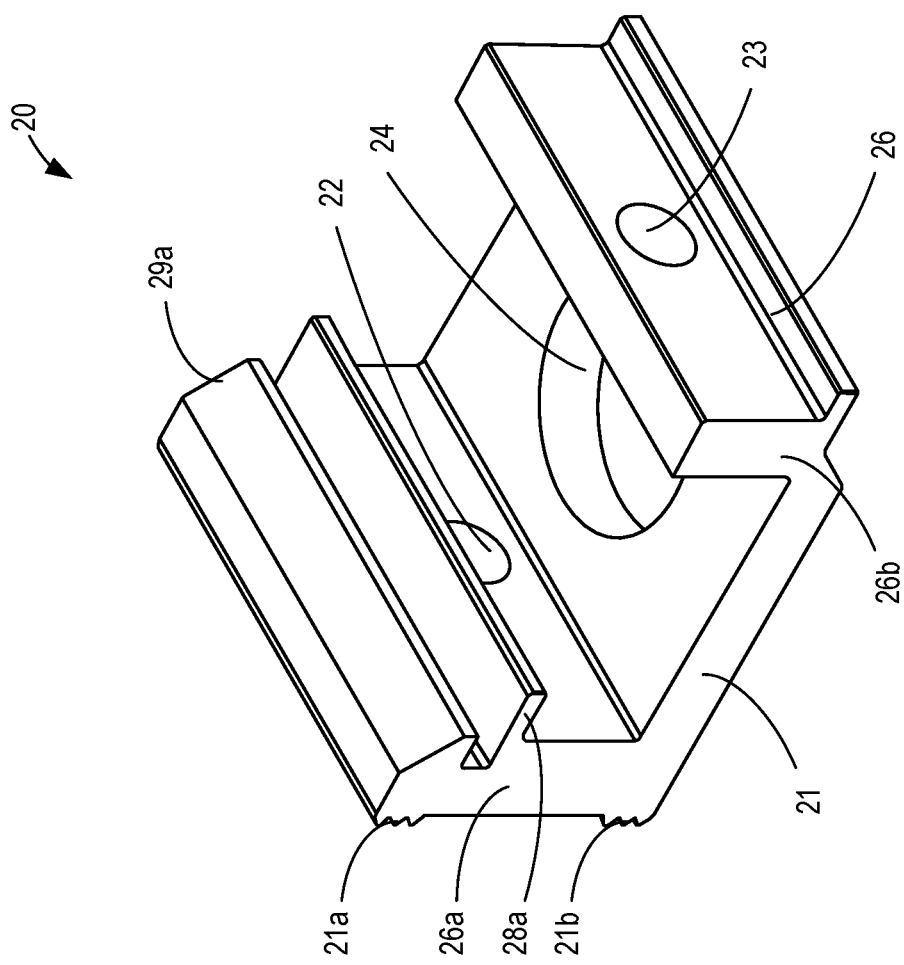
FIG. 7 illustrates an isometric view of the rail connecting member.

FIG. 7 illustrates a perspective view of the rail connecting member 20. The solar module array mounts to the rail connecting member 20 with a rail system or similar mounting means. The rail connecting member 20 may include at least one mating serrated portion 21a; 21b where the rail connecting member 20 contacts the upright portion 13 along the first wall 26a. The serrations of the mating serrated portion 21a; 21b are preferably angled at 60 degrees, but may be angled at any degree that limits or reduces the vertical movement of the rail connecting member 20 in reference to the upright portion 13 when in contact with the serrated portion 11.

Figure 13A:
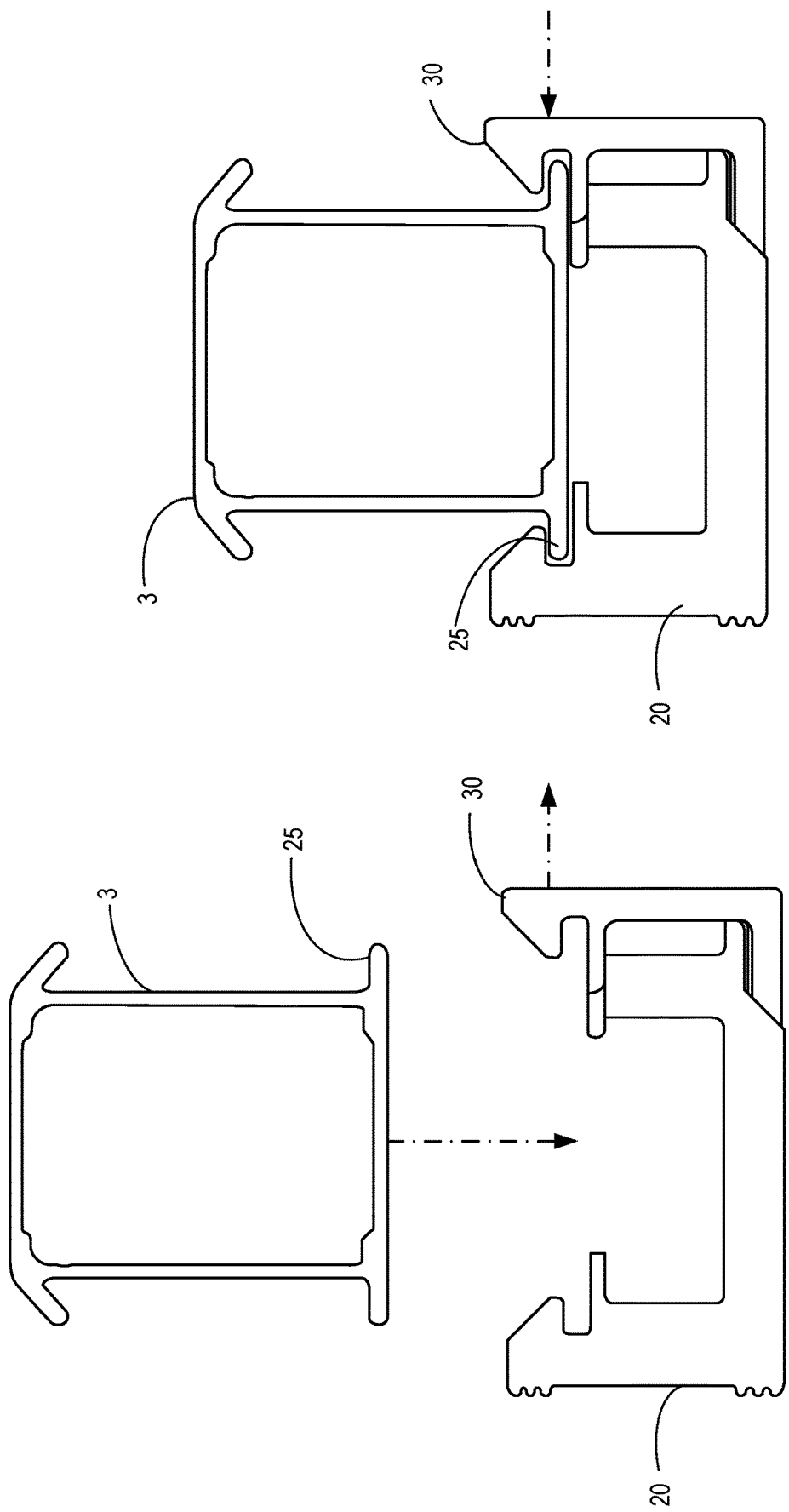
FIG. 13a illustrates a method of installing a rail to the rail attachment bracket.
Figure 13B:
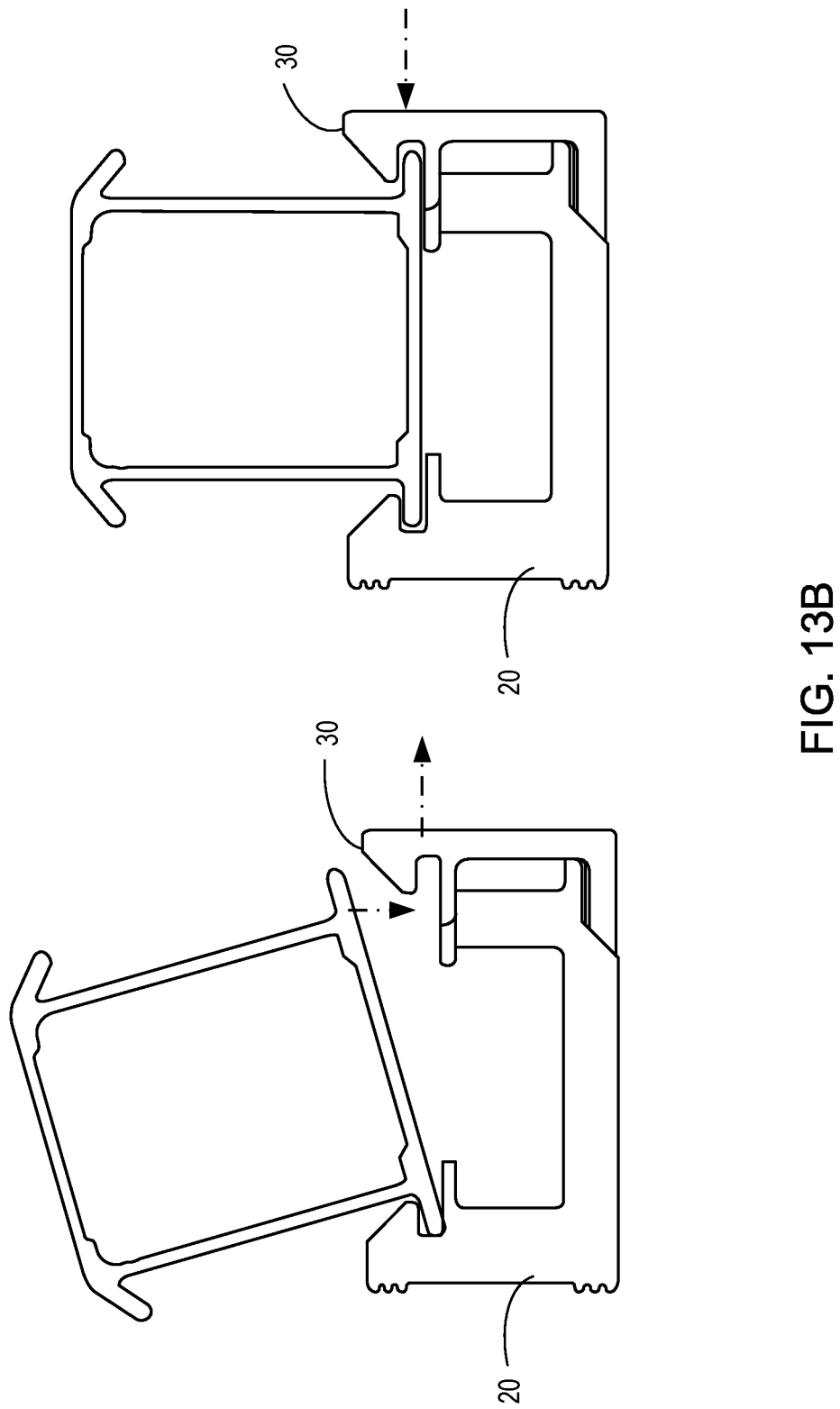
FIG. 13b illustrates an alternative method of installing a rail to the rail attachment bracket.

The rail connecting member 20 may include a second aperture 22 on the first wall 26a. The second aperture 22 may be threaded and surrounded by the mating serrated portion(s) 21a; 21b. The first wall 26a has a first shelf portion 28a on the opposite side of the mating serrated portion 21a; 21b. The first shelf portion 28a protrudes from the first wall 26a to aid in coupling to a side of a rail or an attachment means for a solar module array. Above the first shelf portion 28a, the retaining tooth 29a protrudes from the first wall 26a. The first shelf portion 28a protrudes a distance further than the retaining tooth 29a. The side of a rail or solar module array is coupled between the first shelf portion 28a and the rail attachment tooth 29a, as illustrated in FIGS. 13a and 13b.

The retaining tooth 29a, the first wall 26a, and the first shelf portion 28a together define a first recess 27a configured to receive and retain a protruding flange 25 of the rail 3. The first shelf 28a supports the rail guide 3 or other solar mounting structure or accessory. The recess 27a captures the protruding flange 25. The retaining tooth 29a secures the flange 25 within the recess 27a and the rail guide 3 to the rail connecting member 20.

A third aperture 23 on a second wall 26b opposes the second aperture 22 on the first wall 26a of the rail connecting member 20 of the rail attachment bracket 2. The third aperture 23 may be threaded and receive at least a portion of the threaded length of the second bolt 40b. The rail connecting member 20 includes a bottom portion 21 that extends between and connects the first wall 26a and the second wall 26b. The rail connecting member 20 includes a laterally extending stop 26 which extends perpendicularly from the outside face of the second wall 26b. An access port 24 is located through the bottom portion 21 of the rail connecting member 20. The access port 24 may align with the first aperture 18 of the Roof attachment bracket 10 to allow access to the first aperture 18. The access port 24 may be aligned over a portion of the upright portion 13 or the approximately horizontal section of the mounting bracket 10. The access port 24 is located between the second aperture 22 and the third aperture 23. The access port 24 can be any geometric shape and have a different exit and entrance size through the rail connecting member 20. The access port 24 is at least sized to have a lag screw 60 extend therethrough. The access port 24 is preferably sized to receive a driver, e.g., a socket, for screwing the lag screw to the roof surface and/or structure.

Figure 8:
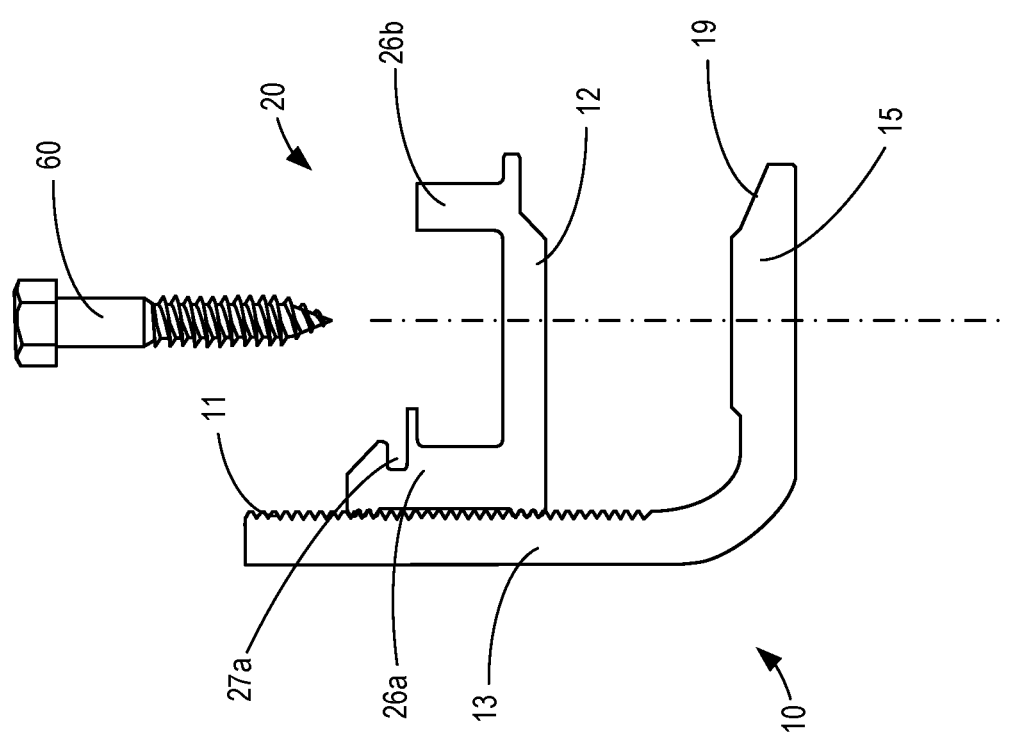
FIG. 8 illustrates a side view of the Roof attachment bracket, rail connecting member, and lag screw.

For installation as illustrated in FIG. 8, the lag screw 60 passes through the access port 24 into the first aperture 18, then is tightened into the roof and/or surface or structure. This arrangement allows the installer to tighten the roof attachment device 1 to the roof or surface independently of adjusting the height of the rail connecting member 20. The installer has increased ease of access if a height adjustment is desired at a later step in the installation of the solar module array. Additionally, the roof attachment device 1 has a more compact design while being hidden under the solar module arrays when installed.

Figure 9A:
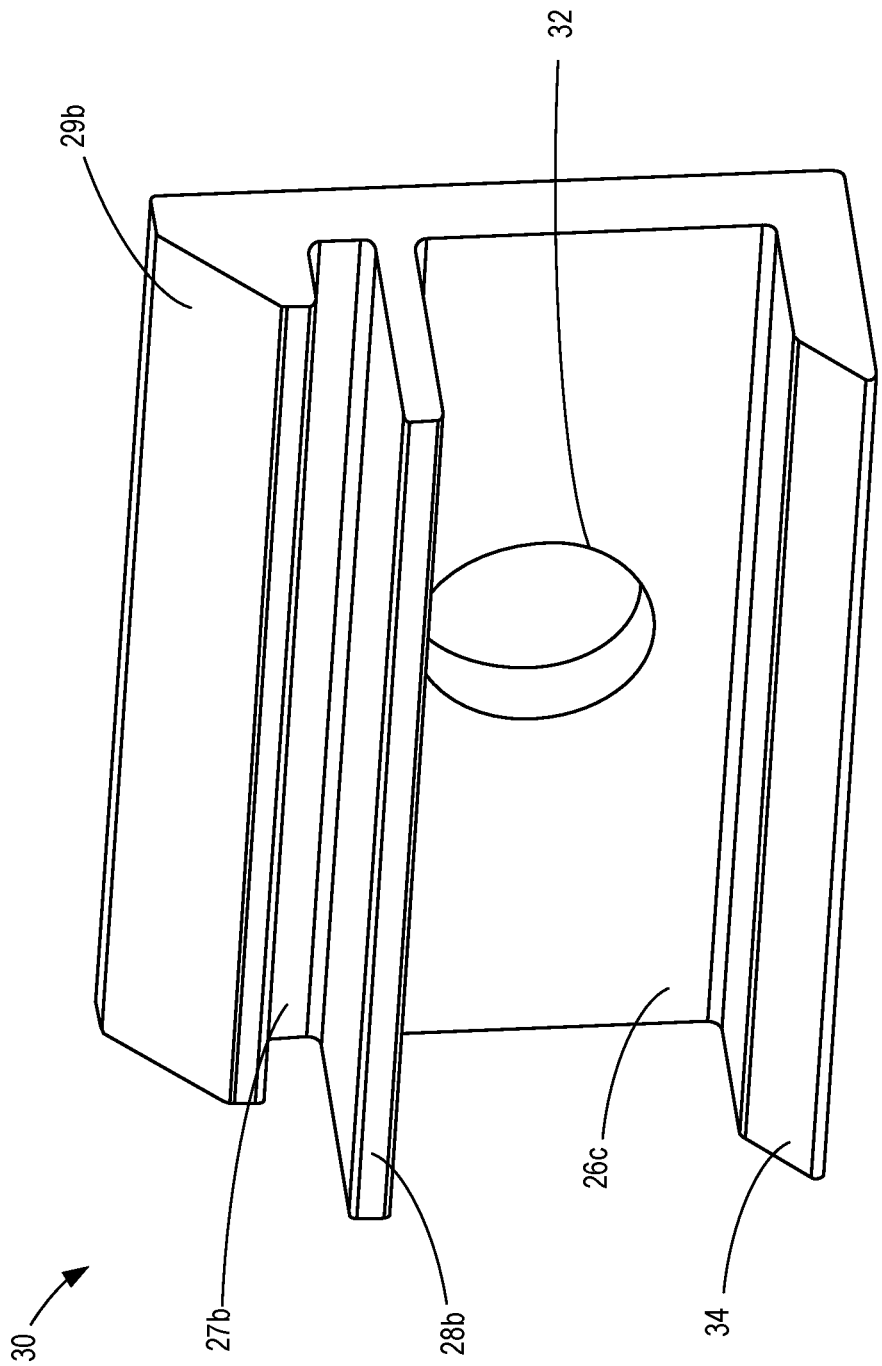
FIG. 9a illustrates an isometric view of the outside clamping member.
Figure 9B:
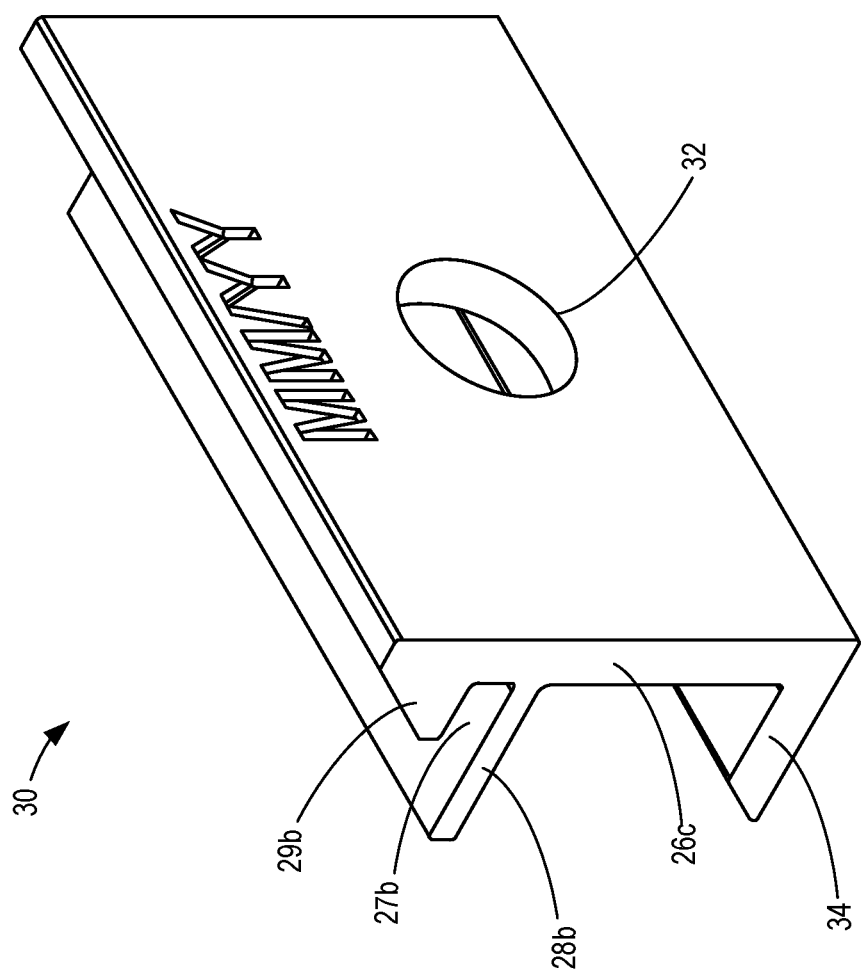
FIG. 9b illustrates another isometric view of the outside clamping member.

As illustrated in FIGS. 9a and 9b, the outside clamping member 30 includes a third wall 26c having an inside face opposing the outside face of the second wall 26b of the rail connecting member 20 and an outside face. The third wall 26c may have a fourth aperture 32 extending therethrough from the outside face to the inside face. The fourth aperture 32 aligns at least with the third aperture 23 of the rail connecting member 20. The fourth aperture 32 may align with at least a section of the elongated aperture 12. The second bolt 40b couples the end clamp 30 to the rail connecting member 20 via the third aperture 23 and the fourth aperture 32 on the second wall 26b. In the preferred embodiment illustrated in FIGS. 1-2, the first bolt 40a, at least a portion of the elongated aperture 12, the threaded opening 22, the threaded opening 23, the fourth aperture 32, and the second bolt 40b are all aligned.

The outside clamping member 30 may have a second shelf portion 28b extending perpendicularly from the third wall 26c which aids in coupling to a side of a rail or solar module array. Above the second shelf portion 28b, the retaining tooth 29b protrudes from the outside clamping portion 30 similarly to the second shelf portion 28b. The side of a rail or solar module array is coupled between the second shelf portion 28b and the retaining tooth 29b. The second shelf portion 28b protrudes a distance further than the retaining tooth 29b.

The retaining tooth 29b, the third wall 26c and the second shelf portion 28b together define a second recess 27b configured to receive and retain a protruding flange 25 of the rail 3. The second shelf 28b supports the rail guide 3 or other solar mounting structure or accessory. The recess 27b captures the protruding flange 25. The retaining tooth 29b secures the flange 25 within the recess 27b and the rail guide 3 to the rail connecting member 20.

The outside clamping member 30, when coupled, may be tightened via the second bolt 40b to more securely mount the solar module rail system between the shelf portions 28a. 28b. When the outside clamping member 30 is tightened to the rail connecting member 20, the spacing between the shelf portions 28a; 28b, the spacing between the recesses 27a; 27b, the spacing between the retaining teeth 29a; 29b, and the spacing between the first wall 26a and the third wall 26c decreases. This tightens the rail connecting member 20 and the outside clamping member 30 around the rail or solar module array when installed, more securely coupling the rail to the rail attachment bracket 2.

The bottom end of the outside clamping member 30 may include arm 34 extending perpendicularly from third wall 26c. Arm 34 projects from the bottom end of the outside clamping member 30 and may have a shaped end. The shaped end mates with a portion of the rail connecting member 20. The bottom portion 21 of the rail connecting member 20 may define a shaped recess configured to receive the extending arm 34. As the outside clamping member 30 is tightened, the spacing between the shaped end of the arm 34 and the receiving portion of the rail connecting member 20 decreases. The shaped end of the arm 34 contacts the end of the receiving portion of the rail connecting member 20 when the outside clamping member 30 is fully tightened to the rail connecting member 20. This prevents over-tightening and eliminates the risk of damaging the rail or solar module array. The rail connecting member 20 includes a laterally extending stop 26 which extends perpendicularly from the outside face of the second wall 26b. When the outside clamping member 30 is tightened to the rail connecting member 20 the end of the stop contacts the inside face of the third wall 26c preventing over-tightening. The rail connecting member 20 and end clamp 30 are shaped to provide a spacing inbetween the outside face or the second wall 26b and the inside face of the third wall 26c when tightened, where the central body of clip 50 is located. The shaped end of the arm 34 may also maintain a level and proper connection and orientation of the end clamp 30 to the rail connecting member 20. The shaped end of arm 34 is shaped to prevent the end clamp 30 from rotating when tightened to the rail connecting member 20. The space between the second shelf 28b and the arm 34 is configured to receive a portion of the second wall 26b aligning the outside clamping member 30 and the rail connecting member 20 in the desired orientation and further preventing rotation of the outside clamping member 30 in relation to the rail connecting member 20.

Figure 10:
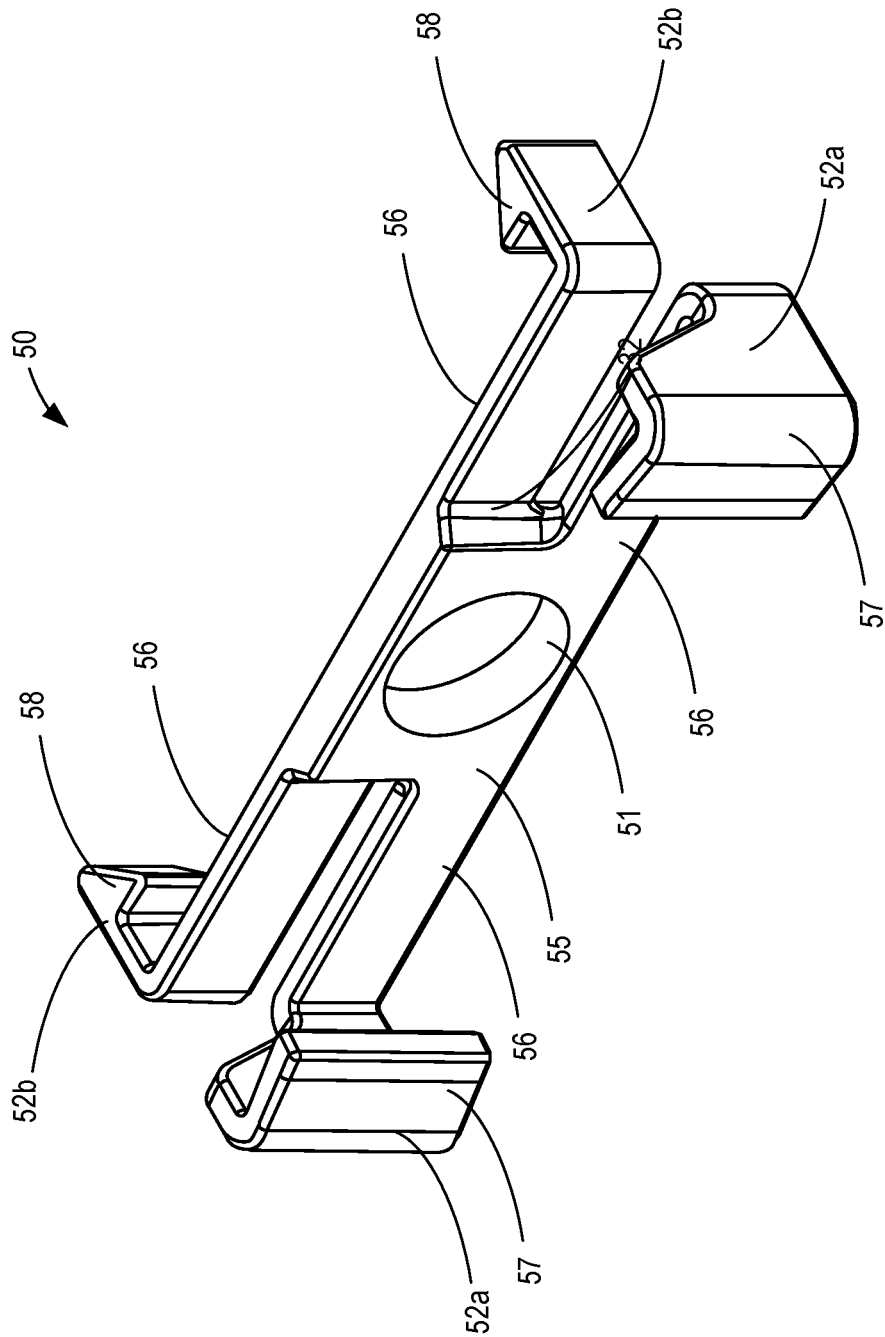
FIG. 10 illustrates an isometric view of the resilient clip.
Figure 11:
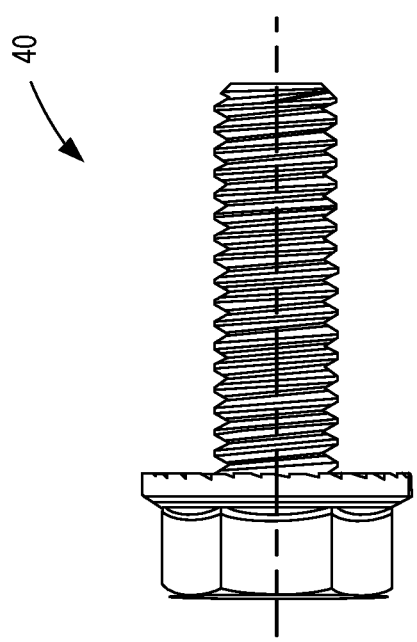
FIG. 11 illustrates a side view of a bolt.

As illustrated in FIG. 10, the resilient clip 50 may have a central body portion 55 defining a center aperture 51 and wings 52a, 52b which loosely couple the clip 50 to the rail connecting member 20 on the second wall 26b and to the outside clamping member 30 on the third wall 26c, respectfully. The center aperture 51 may align with the third aperture 23 and fourth aperture 32 to allow the second bolt 40b to pass through and couple the rail connecting member 20 and the end clamp 30. Then the bolt 40b through the third aperture 23 may be tightened to more securely fix the rail to the rail connecting member 20. By tightening the bolt through the third aperture 23, the end clamp 30 is further tightened against the rail connecting member 20. The clip 50 may be a plastic material or material with similar properties.

The wings 52a, 52b include flexible arms 56 extending from the central body 55. The wings 52a include end portions 57 configured to wrap around the ends of the second wall 26b to couple the resilient clip 50 to the rail connecting member 20. The clip 50 may be coupled to the rail connecting member 20, by sliding the clip 50 downward to fit over the second wall 26b of the rail connecting member 20. The wings 52b include end portions that comprise hook portions 58 configured to extend around the third wall 26c of the outside clamping member 30. The clip 50 may be coupled to the outside clamping member 30 by aligning the second wall 26b between the arm 34 and the second shelf 28b and pressing the third wall 26c between the hooked end portions 58 of the wings 52b. The hooked end portions 58 of the resilient clip 50 spread apart until the third wall 26c clears the hook portions. When the third wall 26b clears the narrowest distance between the hook portions 58 the hooks snap together around the ends of the third wall 26c thereby connecting the third wall 26c to the resilient clip 50. In this way, the resilient clip 50 is coupled to the rail connecting member 20 and the outside clamping member 30 and thereby couples the rail connecting member 20 and the outside clamping member 30 to each other.

The rail or solar module array may be loosely attached to the rail connecting member 20 and end clamp 30 in various ways. As illustrated in FIG. 13a, the rail may be installed by moving the rail in a downward direction towards the rail connecting member 20. The bottom section of the rail and specifically the protruding rail flanges 25 may contact the first and second retaining teeth 29a; 29b approximately simultaneously. Once contacted, a downward directional force is applied to the rail. The distance between the first and second rail attachment teeth 29a; 29b increases until the protruding flanges 25 of the rail 3 passes both. The distance between the retaining teeth 29a; 29b increases by the separating of the rail connecting member 20 and the outside clamping member 30 which can separate because the second bolt 40b is assembled in a loosened position. The rail connecting member 20 and the outside clamping member 30 are held together in a loose but closed relationship by the resilient clip 50. The separating force applied on the retaining teeth 29a; 29b by the protruding flanges 25 of the rail guide 3 forces the flexible arms 56 of the clip 50 to bend, spreading the wings 52a; 52b apart and allowing the outside clamping member 30 to separate a limited distance from the rail connecting member 20. When the rail flanges 25 passes completely by the narrowest distance between the retaining teeth 29a; 29b, the flexible arms 56 are no longer forced apart and rapidly return to their unbent shapes, quickly snapping the outside clamping member 30 and the rail connecting member 20 back together, creating an audible click as parts of the members 20 and 30 come in contact with each other and/or the rail guide 3. Then the first and second rail attachment teeth 29a; 29b snap over the protruding rail flanges 25 and loosely retain the rail guide 3 in the rail attachment bracket 2.

Similarly, as illustrated in FIG. 13b, the rail may be angled to insert one rail flange 25 into one of the first or second recesses 27a or 27b. Once angled, a force is applied to the rail 3 to de-angle the rail 3 making it parallel with the bottom portion 21 of the rail connecting member 20. The uninserted rail flange 25 then contacts the other retaining tooth 29a or 29b applying the separating pressure on the rail connecting member 20 and outside clamping member 30 causing the flexible arms 56 of the clip 50 to bend, spreading the wings 52a and 52b apart and allowing the outside clamping member 30 to separate a limited distance from the rail connecting member 20. When the rail becomes parallel with the bottom portion 21 of the rail connecting member 20, the uninserted flange 25 passes the retaining tooth 29a or 29b, the outside clamping member 30 snaps back together with the rail connecting member 20, the teeth 29a and 29b snap over the rail flanges 25, and the rail 3 is loosely attached to the rail attachment bracket 2 and an audible click is heard.

When the rail 3 or solar module array is loosely attached to the rail attachment bracket 2, as illustrated in FIGS. 13a and 13b, an audible click occurs informing the installer that the rail is properly attached. The audible click is created by the rail attachment teeth 29a, 29b snapping over the rail flanges 25 and parts of the rail connecting member 20 contacting parts of the outside clamping member 30. The clip 50, acting as a spring, allows for limited movement when the rail 3 is being installed and provides the force to have the outside clamping member 30 snap back against the rail connecting member 20 creating the audible click. The audible click informs the installer the rail is loosely fixed to the rail attachment bracket 2 and provides a loose connection to hold the rail in place while the installer may then adjust the height of the rail connecting member 20, adjust the rail laterally within the rail attachment bracket 2 or further tighten the attachment of the rail. The order of these steps is determined by the installer because the height adjustment of the racking system is independent of fixing the roof attachment to the roof.

In more detail, the advantage of the roof attachment device 1 is the versatility and variability in the installation method available for an installer. The roof attachment bracket 10 may be fixed to the roof or surface using a lag screw 60. The upright portion 13 of the roof attachment bracket 10 and the rail attachment bracket 2 may be loosely coupled using the first bolt 40a. Being loosely coupled allows for the serrated portion 11 and mating serrated portion 21 to contact and maintain the height at which the rail connecting member 20 of the rail attachment bracket 2 is coupled to the upright portion 13 of the roof attachment bracket. The height may be adjusted due to the loose fitting. Alternatively, the rail attachment bracket 2 may be fully assembled to the roof attachment bracket 10 with the rail connecting member 20 and upright portion 13 pre-set to a specific height and coupled securely prior to installation and with the outside clamping member 30 and the rail connecting member 20 loosely coupled and held together by the clip 50 and the second bolt 40b in a loosened position. A rail guide 3 or other solar module array piece may be loosely coupled to the rail connecting member 20 as stated above. Then the installer may adjust the height of the rail connecting member 20 in reference to the roof, or the attachment to the rail. Once the location, height, and attachment are correctly placed, the installer may more securely fix each.

One preferred method includes the installation of multiple fully assembled rail attachment devices 1 to the roof. The rail attachment brackets 2 are securely attached and tightened to the upright portions 13 of the roof attachment brackets 10. The rail connecting members 20 and the outside clamping members 30 are loosely connected, held in a closed position by the resilient clips 50 and connected by the second bolts 40b in a loosened position. Then the rail guide(s) 3 are installed in the rail attachment brackets 2 by snapping the rail guide(s) 3 between the outside clamping members 30 and the rail connecting members 20 and thereby into the rail attachment brackets 2. The rails 3 are now held in place and can be observed and the locations, heights, straightness, and levelness of the rails can be assessed. When the location is satisfactory the installer can then tighten the second bolt 40b securely fixing the rails into the rail attachment brackets 2. Then if the levelness or straightness of the rails is inadequate, the installer can loosen the first bolt 40a and adjust the heights as needed. If the installer prefers, the rail heights can be adjusted before the second bolts 40b are tightened.

In an alternative embodiment, the clip 50 may additionally hold the end clamp 30 to the rail connecting member 20 with a spring. The rail system is fully installed when the spring is compressed.

In an alternative embodiment, the second aperture 22 and the third aperture 23 are misaligned.

In an alternative embodiment, the rail connecting member 20 couples to the roof attachment bracket 10 so the access port 24 and the first aperture 18 are not aligned.

Installation of the roof attachment device 1 on a roof or surface according to some embodiments is accomplished by the following steps: selecting a location for the roof attachment device 1 to be fastened based on the solar module array being installed, positioning the roof attachment device 1 on the selected location, using a lag screw 60 to loosely fix the roof attachment device 1 to the roof or surface, loosely fixing the solar module array rail system to the rail connecting member 20 until an audible click is heard, adjusting the height of the rail connecting member 20 with respect to the Roof attachment bracket 10, adjusting the location of the roof attachment device 1 if desired, and securely fixing the roof attachment device 1, the height of the rail connecting member 20, and the solar module array to the rail connecting member 20.

The steps of installation do not have to be performed in the above stated order. The installer may choose to adjust the height of the rail connecting member 20 before loosely fixing the solar module array to the rail connecting member 20. The height of the rail connecting member 20 in reference to the Roof attachment bracket 10 may already be fixed before installation. This provides the installer with an advantage of a greater ease of installation and adjustment through the installation process.

Additionally, fixing the loose attachments may be done in intervals with the bolts 40a, 40b or the lag screw 60 per the installer's discretion. Advantageously, the installer has access to the bolts 40a, 40b at all times during the installation process. Each bolt 40a, 40b may be adjusted independently of one another.

The invention claimed is:
1. A roof attachment device comprising:
   a roof attachment bracket having an upright portion and an elongated aperture;
   a rail attachment bracket comprising
   a rail connecting member having a second aperture on a first wall, a third aperture on a second wall, a bottom portion, and an access port, the first wall comprises a first shelf, a first retaining tooth and a first recess therebetween;
   a clamping member having a fourth aperture; and
   a second bolt connecting the rail connecting member and the clamping member; and
   a first bolt coupling the upright portion to the rail attachment bracket; wherein the first bolt and the second bolt are aligned.

2. The roof attachment device of claim 1, wherein the roof attachment bracket has a serrated portion that couples to the rail connecting member.

3. The roof attachment device of claim 1, wherein the rail connecting member has a serrated portion that couples to the roof attachment bracket.

4. The roof attachment device of claim 1, wherein the rail attachment bracket further comprises a clip which couples the rail connecting member to the clamping member, the clip having a center aperture to allow the second bolt to pass through the clip.

5. The roof attachment device of claim 1, wherein the clip creates an audible sound by urging the rail connecting member and the clamping member against each other.

6. The roof attachment device of claim 1, wherein the clamping member includes a third wall and an extending arm.

7. The clamping member of claim 6, wherein the third wall has a second shelf, a second retaining tooth and a second recess therebetween.

8. The rail connecting member of claim 1, wherein the bottom portion defines a shaped recess configured to receive the extending arm.

9. A method of installing a rail to the roof attachment device of claim 1, comprising:
   pushing the rail in a downward direction towards the rail connecting member, the rail connecting member having a second aperture on a first wall, a third aperture on a second wall, a bottom portion, and an access port, the first wall comprises a first shelf, a first retaining tooth and a first recess therebetween;
   contacting a bottom portion of the rail with the retaining tooth of the rail connecting member and the end clamp;
   applying a downward directional force to the rail to cause the lateral distance between the first and second rail attachment teeth to increase until the flanges of the rail pass the attachment teeth downward; and
   tightening at least one of the first bolt or the second bolt to releasably fix the rail to the rail connecting member.

10. The method of installing a rail to the roof attachment device of claim 9, further comprising angling the rail such that one of the rail flanges contacts the retaining teeth of the rail connecting member or the end clamp before the other rail flange.

11. The method of installing a rail to the roof attachment device of claim 9, further comprising loosening at least one of the first bolt or the second bolt, the first bolt coupling the upright portion to the rail attachment bracket; wherein the first bolt and the second bolt are aligned.

* * * * *